United States Patent [19]
Nagatsuka

[11] Patent Number: 5,993,898
[45] Date of Patent: Nov. 30, 1999

[54] FABRICATION METHOD AND STRUCTURE FOR MULTILAYER OPTICAL ANTI-REFLECTION COATING, AND OPTICAL COMPONENT AND OPTICAL SYSTEM USING MULTILAYER OPTICAL ANTI-REFLECTION COATING

[75] Inventor: Jun Nagatsuka, Foster City, Calif.

[73] Assignee: Nikon Corporation, Japan

[21] Appl. No.: 08/858,801

[22] Filed: May 19, 1997

[51] Int. Cl.⁶ ..................... B05D 5/06
[52] U.S. Cl. ............. 427/162; 427/248.1; 427/166; 427/167; 427/255; 427/419.2; 427/419.3
[58] Field of Search ............ 427/162, 248.1, 427/255, 166, 167, 419.2, 419.3

[56] References Cited

U.S. PATENT DOCUMENTS

| | | | |
|---|---|---|---|
| 4,387,960 | 6/1983 | Tani | 350/164 |
| 4,568,140 | 2/1986 | van der Werf et al. | 350/1.6 |
| 4,599,272 | 7/1986 | Ichikawa | 428/412 |
| 4,778,731 | 10/1988 | Kraatz et al. | 428/623 |
| 4,816,333 | 3/1989 | Lange et al. | 428/331 |
| 5,104,692 | 4/1992 | Belmares | 427/164 |
| 5,173,368 | 12/1992 | Belmares | 428/426 |
| 5,243,458 | 9/1993 | Hatano et al. | 359/359 |
| 5,282,084 | 1/1994 | Hatano | 359/360 |
| 5,332,618 | 7/1994 | Austin | 359/359 |
| 5,398,133 | 3/1995 | Tsai et al. | 359/589 |
| 5,523,649 | 6/1996 | Tong et al. | 313/479 |
| 5,532,871 | 7/1996 | Hashimoto et al. | 359/359 |
| 5,552,178 | 9/1996 | Seo et al. | 427/64 |
| 5,652,477 | 7/1997 | Tong et al. | 313/479 |

OTHER PUBLICATIONS

O'Neill et al., "Colloidal silica coatings for KrF and Nd:glass laser applications", Applied Optics, vol. 26, No. 5. Mar. 1987, pp. 828–832.

Ian M. Thomas, "Method for the preparation of porous silica antireflection coatings varying in refractive index from 1.22 to 1.44", Applied Optics, vol. 31, No. 28, Oct. 1992, pp. 6145–6149.

Kozlowski et al., "Future Trends in Optical Coatings for High–Power Laser Applications", SPIE vol. 2262, pp. 54–57 (No date).

Ian M. Thomas, "High laser damage threshold porous silica antireflective coating", Applied Optics, vol. 25, No. 9, May 1986, pp. 1481–1483.

Ian M. Thomas, "Effect of binders on the damage threshold and refractive index of coatings prepared from colloidal suspensions", SPIE vol. 18 48 Laser–Induced Damage in Optical Materials: 1992, pp. 281–289 (No mo.).

P.F. Belleville et al., "A new room–temperature deposition technique for optical coatings", SPIE vol. 1848 Laser–Induced Damage in Optical Materials, 1992, pp. 290–298 (No mo).

N. Rizvi et al., "192 nm imaging using a small–field high–resolution resist exposure tool", The International Society For Optical Engineering, SPIE vol. 2726, pp. 721–731, Mar. 1996.

*Primary Examiner*—Janyce Bell
*Attorney, Agent, or Firm*—Skjerven, Morrill, MacPherson, Franklin & Friel LLP; Norman R. Klivans

[57] ABSTRACT

An optical anti-reflection coating having multiple layers, where at least some of the layers are formed by a dry coating process and other layers are formed by a wet coating process. This combination of different types of anti-reflection layers provides superior performance in terms of low reflectance over a wide bandwidth of incident light wavelengths, and also low reflectance over a wide range of incident light angles. This is accomplished using fewer layers than would be needed using all dry process layers in the ARC. Alternatively, one may obtain an ARC having performance equivalent to that of an all dry process layer ARC but using fewer layers by using the combination of a wet process and a dry process. Furthermore, this combination of wet process and dry process layers provides a high performance anti-reflection coating which cannot be fabricated using only a dry process.

25 Claims, 6 Drawing Sheets

FABRICATION METHOD AND STRUCTURE FOR MULTILAYER OPTICAL ANTI-REFLECTION COATING, AND OPTICAL COMPONENT AND OPTICAL SYSTEM USING MULTILAYER OPTICAL ANTI-REFLECTION COATING

FIELD OF THE INVENTION

This invention relates to optical anti-reflection coatings, and more specifically to multilayer anti-reflection coatings. Furthermore, this invention relates to optical components (lens elements) and optical systems using multilayer optical coatings.

BACKGROUND

Anti-reflection coatings (ARC) are widely used on optical surfaces (e.g., in lenses, prisms etc.) to suppress undesirable reflections. In general, such anti-reflection coatings are fabricated by a "dry" process, meaning non-liquid coating processes such as vacuum evaporation, sputtering or CVD (Chemical Vapor Deposition). See e.g. Joy George, Preparation of Thin Films (Marcel Dekker, Inc., New York, 1992) and Francois R. Flory, Thin Films for Optical Systems (Marcel Dekker, Inc., New York, 1995). In the case of a multilayer ARC, in order to obtain high performance (wide AR wavelength bandwidth, very low reflectance and wide angular AR bandwidth), it is well known that several kinds of coating materials which have respectively different refractive indices are needed. It is also known that the larger the difference of the refractive indices of the various coating materials, the better the optical performance, and the lower the refractive index of the lowest refractive index coating material used, the better the optical performance. Furthermore, it is possible to reduce the number of coating layers by use of both a large difference between the refractive indices of the various coating materials used and one of the various coating materials used having a very low refractive index.

However, for shorter wavelengths of incident light (e.g. near 200 nm), many kinds of coating materials cannot be used for an ARC which requires high transmittance, because of optical loss due to the light absorption by the coating material. Therefore, the number of coating materials which can be used at such short wavelengths (such as in the 200 nm ultra violet region) is limited, and so it is difficult to obtain a large enough difference between the refractive indices of the coating materials used, and to obtain a very low refractive index of one of the various coating materials used. Thus, it is difficult to design and fabricate high performance anti-refraction coatings with adequate performance for such wavelength regions.

For instance, for a typical ARC material formed by a dry process for the visible light region, a variety of ARC materials can be used. In general, in the visible light region, the highest refractive index material available is $TiO_2$ (n=2.4 to 2.7 at 500 nm), and $MgF_2$ (n=1.38 at 500 nm) is the lowest refractive index material available (where n is refractive index). For shorter wavelengths of incident light such as near 200 nm (ultra violet), however few ARC materials are available. In general, $LaF_3$, $NdF_3$ and $GdF_3$ (all having n of about 1.7 at about 200 nm) are the highest refractive index coating materials available and $Na_3AlF_6$ (n=1.36 at 200 nm) is the lowest refractive index coating material available. Therefore the difference between refractive indices of coating materials which can be used for the 200 nm wavelength region is much smaller than the difference of those for the visible light region. Those skilled in the art will readily appreciate that one consequence of the limited coating materials for short wavelength incident light is that ARC design and fabrication is much more difficult for the short wavelength region than for the visible light region.

In the case of an ARC for the visible light region, it is possible to obtain a low reflectance ARC having wide bandwidth that suppresses reflections over a large range of the visible light region (e.g. the reflectance is less than 0.5% from 400 to 800 nm wavelength.). However, many ARC layers (i.e. more than eight or nine) may be needed, extending manufacturing time increasing cost.

In the case of wet process anti-reflection coatings, such coatings are typically fabricated by the hydrolysis and the polymerization of a metal alkoxide solution, i.e., using a liquid; this wet process is called the sol-gel process. It is well known that optical coatings of $SiO_2$, $ZrO_2$, $HfO_2$, $TiO_2$, $Al_2O_3$, etc. can be fabricated not only by the dry process but also by the sol-gel process. See e.g. Ian M. Thomas, Applied optics Vol. 26, No. 21 (1987) pp. 4688–4691 and Ian M. Thomas, SPIE vol. 2288 Sol-Gel Optics III (1994) pp. 50–55. In the case of a $SiO_2$ coating formed by the sol-gel process, the colloidal $SiO_2$ suspensions that are suitable for the preparation of the $SiO_2$ coating are usually prepared by the hydrolysis of silicon alkoxides in a parent alcohol as a solvent. The hydrolysis of tetraethyl silicate in ethanol, for instance, can be summarized by the following:

$$Si(OC_2H_5)_4 + 2H_2O \rightarrow SiO_2 + 4C_2H_5OH$$

This reaction is complex and many variables such as catalyst, solvent, water ratio, and temperature all have an effect on the nature of the product. Furthermore, three types of liquid coating methods: spin, dip and meniscus are normally used to make wet process coatings. Spin and dip coating are common and widely used. Dip coating is preferred for large samples of irregular shape or having a curved surface. Spinning is excellent for small, round, flat or gently curved samples. Meniscus is particularly good for large, flat substrates. See e.g. Brinker and Scherer, Sol-Gel Science (Academic Press, Inc., San Diego, 1990); and Floch, Priotton and et al., Thin Solid Films, Vol. 175 (1989) pp. 173–178.

By using such a wet process, one generally obtains coatings which can have either high packing density and low packing density. In order to obtain wet process coatings with a high packing density equal to that of coatings formed by a dry process, it is necessary to heat the coating to high temperature (e.g. more than 450 degree C.), in the fabricating process. Not only does this result in a long manufacturing time and high cost, but also may result in damage or degradation to the substrate. However, it is easy to obtain low packing density coatings using the wet process, because an additional process such as heating is not required (since the process can be carried out at room temperature or less than 150 degrees C.).

Since the structure of coatings can be defined as micropores spacing apart deposited solid material, the relation between packing density and refractive index of optical coating is:

$$n_f = n_o \times P + n_p \times (1-P)$$

Where $n_p$ is the refractive index of the material (e.g. air, water) which fills up the micro-pores, $n_f$ and $n_o$ are respectively the actual refractive index (dependent on packing density) and the refractive index of the deposited solid material, and P is the packing density of the coating. Furthermore packing density P is defined as:

P=(Volume of the solid part of the coating)/(Total volume of the coating (solid+pores)).

Thus, high and low packing density mean high and low refractive index respectively. In the case of a $SiO_2$ coating fabricated by a wet process, the packing density can vary from 1 to approximately 0.5, and thereby the refractive index can vary from 1.45 to 1.22 in the visible light region. Thus, one obtains a nearly 0% reflectance single layer ARC on optical glass by using a wet process low packing density $SiO_2$. This $SiO_2$ ARC is also well known to have a high laser light damage threshold value. Therefore, this ARC is used for high power lasers, e.g. for nuclear fusion. See Ian M. Thomas, Applied Optics Vol. 31, No. 18 (1992) pp. 6145–6149.

SUMMARY

In accordance with this invention, both dry process and wet process coating materials are used in combination to fabricate a multilayer anti-reflection coating having a wide bandwidth, thereby to obtain a high performance anti-reflection coating.

This allows fabrication of multilayer anti-reflection coatings including a wet process coating layer having a refractive index which cannot be attained by a conventional dry process. This results in an ARC having superior performance compared to an all dry process ARC. Thus, using a wet process layer one can fabricate an anti-reflection coating having characteristics not available using only a dry process (e.g. an ARC having wide bandwidth for the ultra violet region or a wide range of incident angles for the light of an ArF laser). It is also possible to reduce the number of coating layers, in comparison with the number of layers using only the conventional dry process, while maintaining or improving the anti-reflection performance.

There are several advantages of an ARC in accordance with the present invention. It is possible to fabricate a high performance (wide bandwidth, wide range of incidence angles, etc.) low reflectance anti-reflection coating not possible to form using only a conventional dry process ARC. For the same anti-reflection performance as achieved by a conventional dry process, it is possible to reduce the number of ARC layers by using this invention. It is possible to reduce the manufacturing time and cost due to the reduced number of ARC layers. ARCs using this invention are adapted for shorter wavelengths due to the small number of layers, because the thinner total thickness of the multilayer coating causes smaller absorption by the coating. It is possible to obtain an ARC with a higher laser damage threshold value than that formed by a conventional dry process.

DETAILED DESCRIPTION

Figure 1:
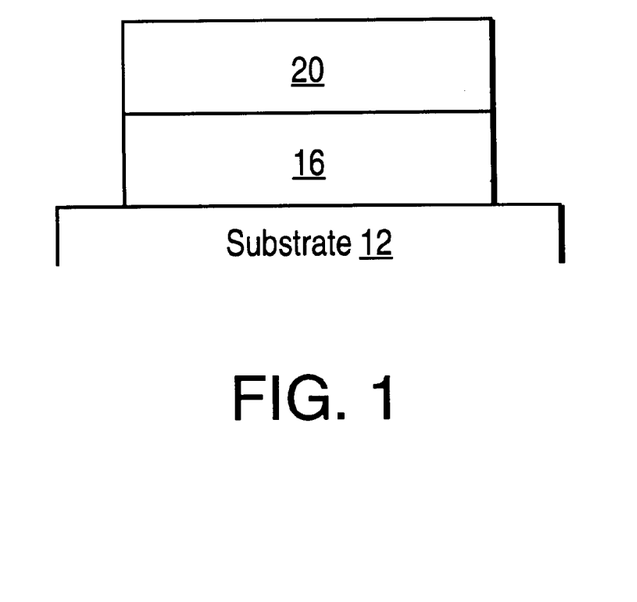
FIG. 1 shows a configuration of a two layer ARC in accordance with the invention.

The following discloses four examples of ARCs in accordance with the invention: these are illustrative and not limiting. Example 1 is a wideband ARC intended for the visible light region, e.g. for lenses and prisms of a camera or other optical systems, for the entire visible light spectrum. The visible light spectrum is light having a wavelength from approximately 400 to 800 nm. This ARC is shown in cross section (and not to scale) in FIG. 1, and includes two ARC layers formed on substrate 12 (e.g. optical glass). The first layer 16 is a $SiO_2$ coating having a refractive index of 1.45 at 500 nm and a optical thickness of 132 nm. This is equal to 0.264×500 nm, the nominal center wavelength $\lambda_0$ for calculation of optical characteristics of the coating. The first (lower) layer 16 can be fabricated by either a dry or wet process, but it is easier to use a dry process. The dry process is preferred as it reduces the manufacturing time and cost.

Figure 2:
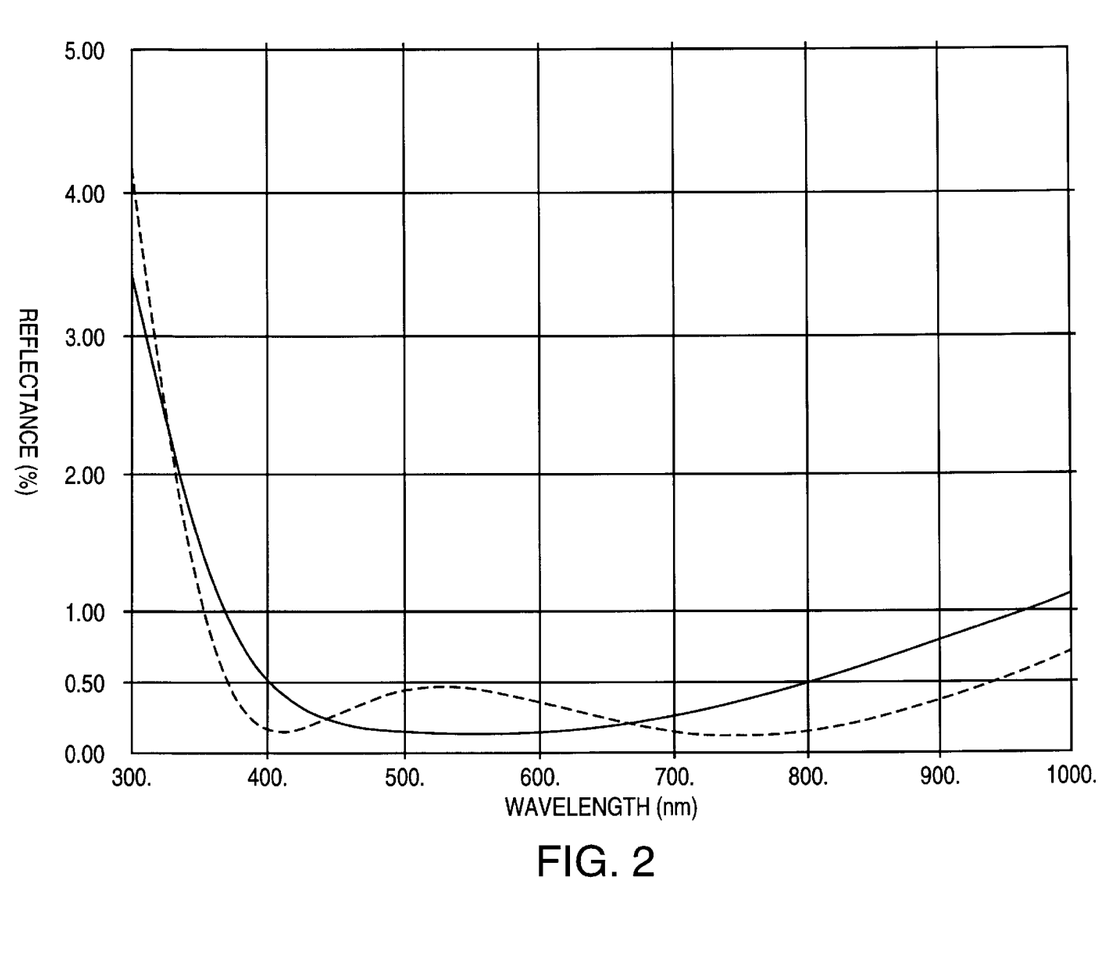
FIG. 2 shows performance of the FIG. 1 ARC.

The second (upper) layer 20 is a $SiO_2$ coating having a refractive index of 1.22 at 500 nm and an optical thickness of 134 nm (0.268 times the nominal center wavelength $\lambda_0$). The second layer 20 is fabricated by a wet process to obtain the desired refractive index. The optical reflection performance of this coating (when the entrance medium is air) at 0 degree incidence onto optical glass BK7 manufactured by Schott Glass Technologies, Inc. (having n=1.52 at 500 nm) and optical glass F2 manufactured by Schott Glass Technologies, Inc. (having n=1.62 at 500 nm) substrates, which are the best known conventional glasses for cameras or other visible light optical systems, is shown in FIG. 2. The solid line in FIG. 2 is the optical reflection performance of this coating on BK7 glass and the dotted line is that on F2 glass; both reflectances are less than 0.5% over the entire visible light spectrum. This coating can be favorably applied to the lenses and prisms for cameras and the other optical systems.

Figure 3:
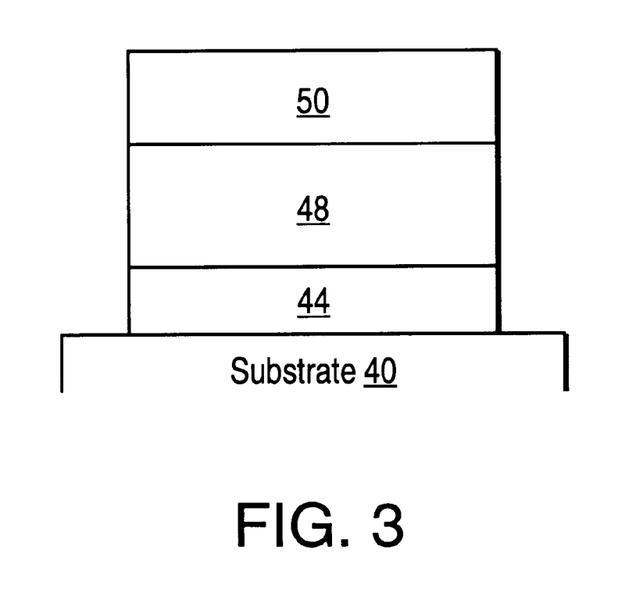
FIG. 3 shows a configuration of a three layer ARC in accordance with the invention.
Figure 4:
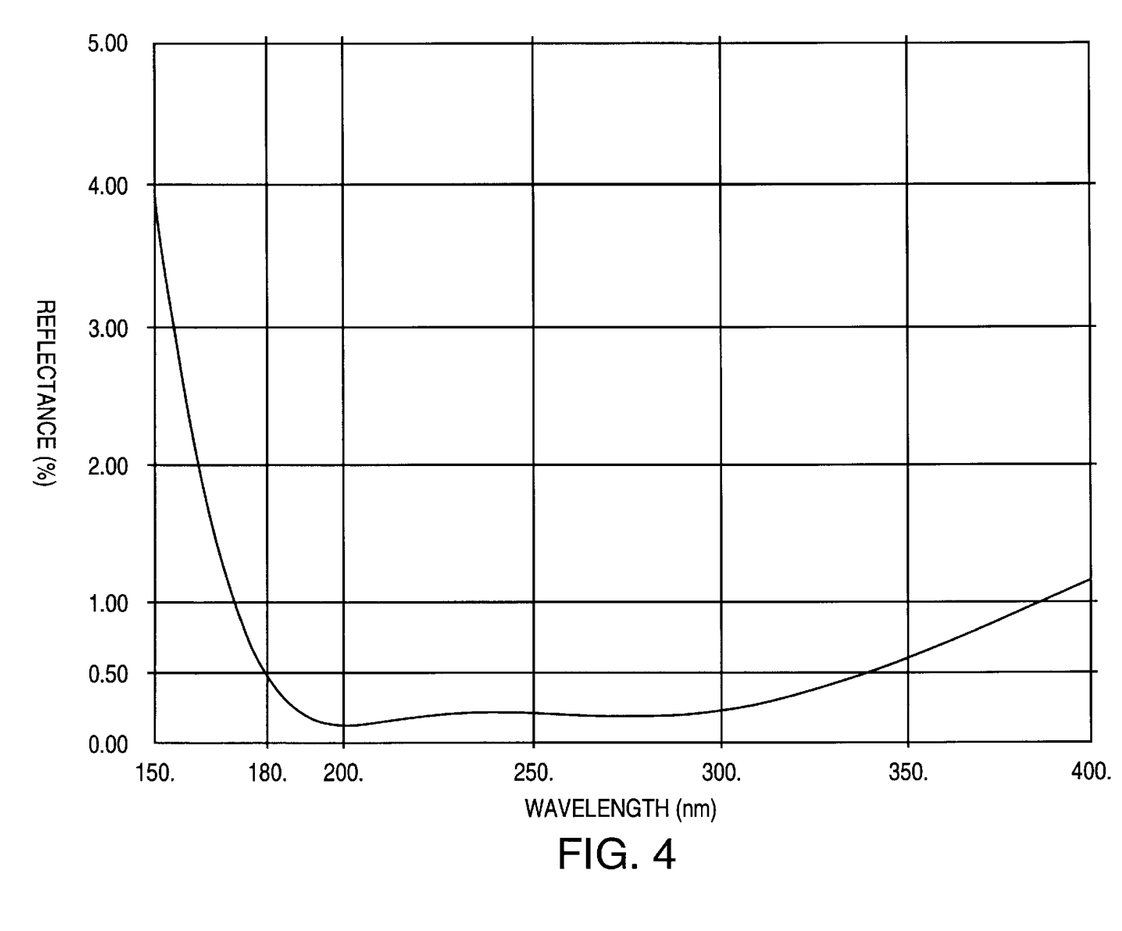
FIG. 4 shows performance of the FIG. 3 ARC.

Example 2 is a wideband ARC intended for the ultra violet light region (wavelength of 180 to 350 nm), shown in cross section (and not to scale) in FIG. 3 formed on substrate 40. This coating has three layers; the first (lower) layer 44 is $LaF_3$, or $NdF_3$, or $GdF_3$, having a refractive index of approximately 1.70 at 200 nm and an optical thickness of 12 nm (0.06 times the nominal center wavelength $\lambda_0$ of 200 nm); the second layer 48 is $SiO_2$ having a refractive index of 1.52 at 200 nm and an optical thickness of 82 nm (0.41 times the nominal center wavelength), and the third layer 50 is $SiO_2$ having a refractive index of 1.25 at 200 nm and a optical thickness of 60 nm (0.3 times the nominal center wavelength). The first layer 44 is fabricated using a dry process and the second layer 48 can be fabricated using either a wet or dry process, but it is easier to use a dry process. Thus, the dry process is preferred to reduce the manufacturing time and the cost. The third layer 50 is fabricated using a wet process. The optical reflection performance for this coating (when the entrance medium is air) at 0 degree incidence when coated onto a fused silica glass substrate 40 (which has high transmission in the ultra violet region, has a refractive index of 1.54 at 200 nm is shown in FIG. 4; the reflectance is less than 0.5% over the very wide ultra violet region (i.e. approximately 180 to 350 nm).

Example 3 is a wide range of incident angles (e.g. 0 to 55 degrees) ARC intended for KrF laser light (having a wavelength of 248.4 nm). This ARC may be utilized for optical components and systems for use in optical lithography equipment, such as, for example, lenses and prisms for the projection and illumination systems of a lithography tool. This ARC is shown in cross section (and not to scale) in FIG. 5, and includes six ARC layers formed on substrate 60. All of the layers are dry process layers except for the topmost $SiO_2$ layer, and having the center wavelength of 248 nm. The coating materials, the refractive indices and the optical thicknesses of various layers, from the substrate up are shown in Table 1.

TABLE 1

Figure 5:
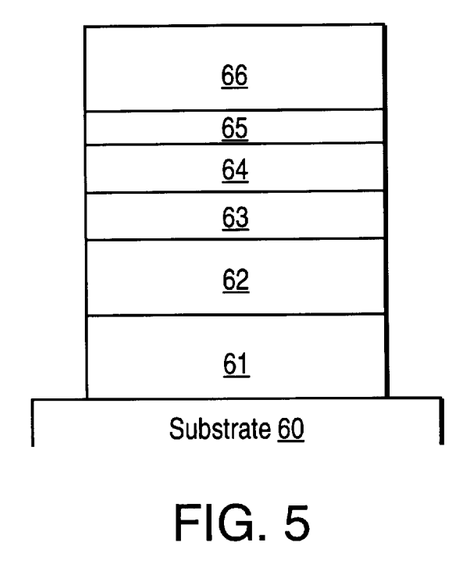
FIG. 5 shows a configuration of a six layer ARC in accordance with the invention.

| number of layer | coating material | ref. index (n) at 200 nm | optical thickness |
| --- | --- | --- | --- |
| 1st (lower) layer 61 | Al$_2$O$_3$ | 1.75 | 79 nm |
| 2nd layer 62 | HfO$_2$ | 2.3 | 62 nm |
| 3rd layer 63 | Al$_2$O$_3$ | 1.75 | 30 nm |
| 4th layer 64 | HfO$_2$ | 2.3 | 30 nm |
| 5th layer 65 | SiO$_2$ | 1.52 | 12 nm |
| 6th layer 66 | SiO$_2$ by a wet process | 1.25 | 79 nm |

Figure 6:
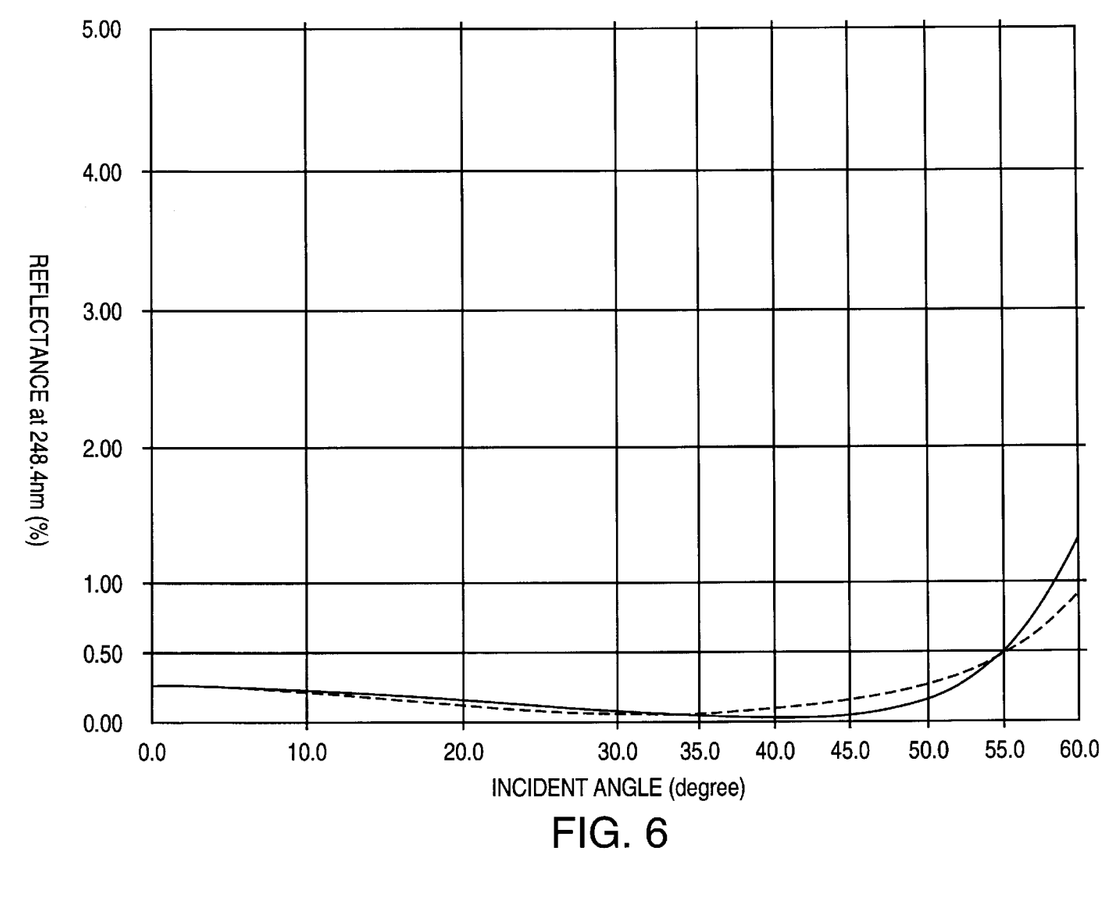
FIG. 6 shows performance of the FIG. 5 ARC.

The optical reflection performance for KrF laser light (248.4 nm) for various incident angles for this coating when coated onto a fused silica glass substrate 60 is shown in FIG. 6. In FIG. 6, the entrance medium is air and the substrate 60, which has high transmission in the ultra violet region, has a refractive index of 1.54 at 200 nm. The solid line in FIG. 6 is the optical reflection performance at 248.4 nm to incident angles of s polarization light and the dotted line is that of p polarization light; both reflectances are favorably less than 0.5% from 0 to 55 degrees angle of incidence. As mentioned previously, this coating can be applied to the optical surfaces of lenses and prisms used in projection and illumination components of a lithography tool.

Example 4 is a wide range of incidence angles (e.g. 0 to 55 degrees) ARC intended for ArF laser light (having a wavelength of 193.4 nm). This ARC may be utilized for optical components of optical lithography equipment, such as, for example lenses and prisms for the projection and illumination systems of a step and repeator step and scan system. This ARC is shown in cross section (and not to scale) in FIG. 7 and includes seven ARC layers on substrate 70. All of the layers are dry process layers except for the topmost SiO$_2$ layer, and have a center wavelength of 193 nm. The coating materials, the refractive indices and the optical thicknesses of various layers, from the substrate up are shown in Table 2.

TABLE 2

Figure 7:
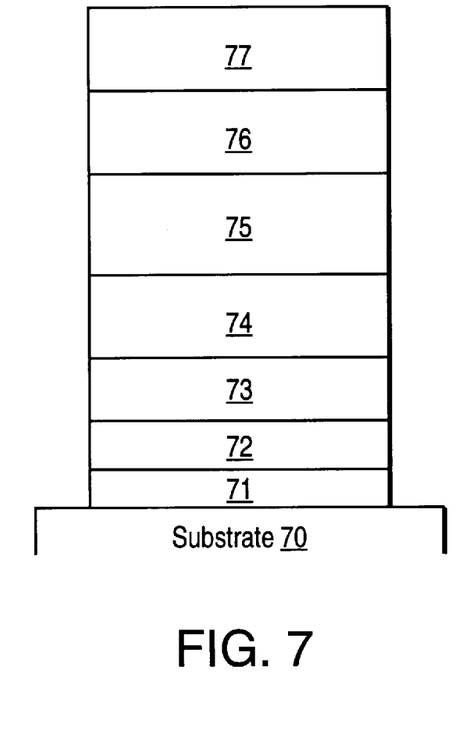
FIG. 7 shows a configuration of a seven layer ARC in accordance with the invention.

| number of layer | coating material | ref. index (n) at 200 nm | optical thickness |
| --- | --- | --- | --- |
| 1st (lower) layer 71 | NdF$_3$ or LaF$_3$ or GdF$_3$ | 1.70 | 14 nm |
| 2nd layer 72 | MgF$_2$ | 1.42 | 17 nm |
| 34d layer 73 | NdF$_3$ or LAF$_3$ or GdF$_3$ | 1.70 | 33 nm |
| 4th layer 74 | SiO$_2$ | 1.52 | 53 nm |
| 5th layer 75 | MgF$_2$ | 1.42 | 73 nm |
| 6th layer 76 | SiO$_2$ | 1.52 | 51 nm |
| 7th layer 77 | SiO$_2$ by a wet process | 1.25 | 58 nm |

Figure 8:
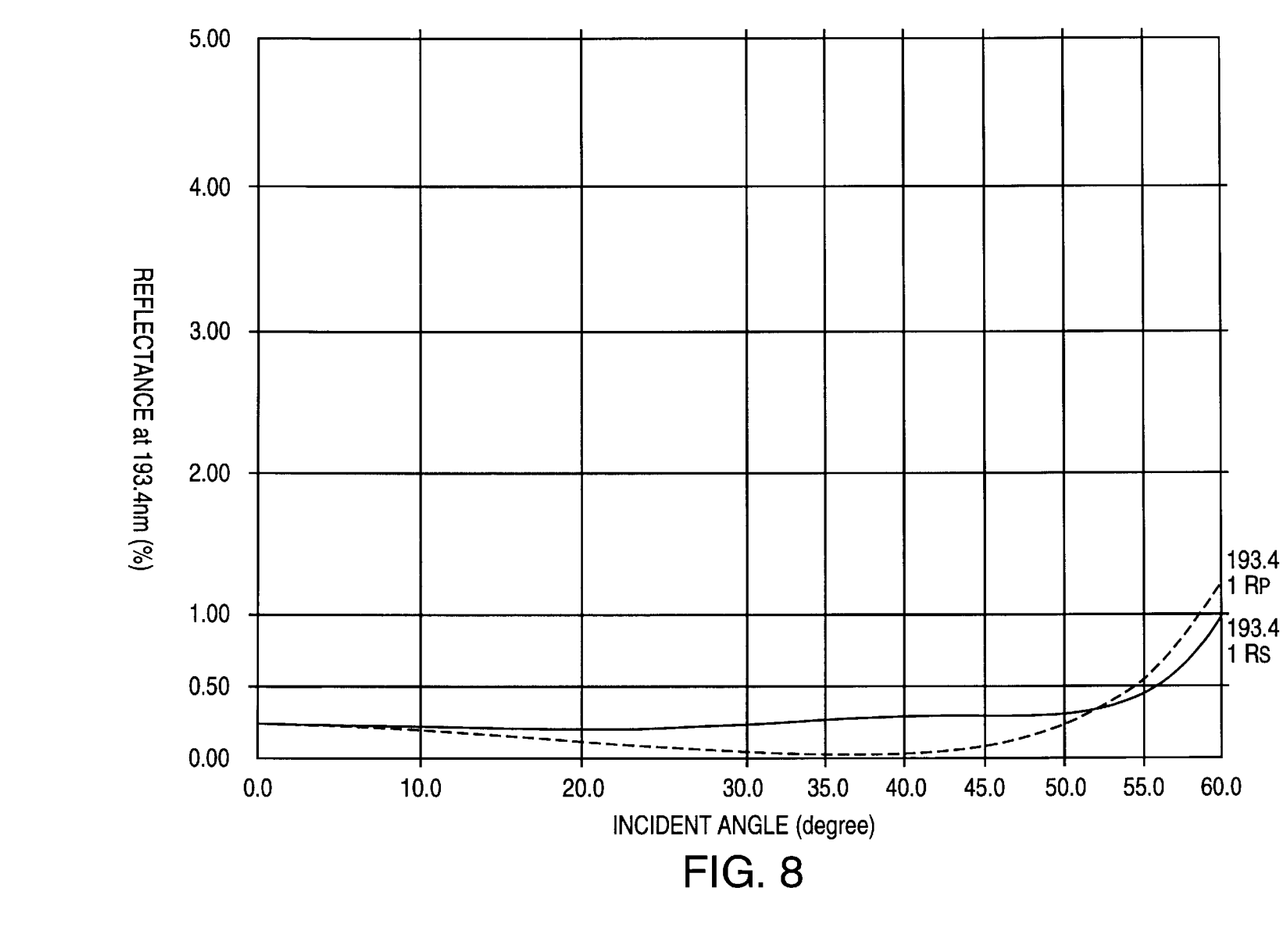
FIG. 8 shows performance of the FIG. 7 ARC.

The optical reflection performance for ArF laser light (193.4 nm wavelength) to various incidence angles for this coating when coated onto a fused silica glass substrate 70 is shown in FIG. 8. In FIG. 8, the entrance medium is air and the substrate 70, which has a high transmission in the ultra violet regiun, has a refractive index of 1.54 at 200 nm. The solid line in FIG. 8 is the optical reflection performance at 193.4 nm to incidence angles of s polarization light and the dotted line is that of p polarization light; both reflectances are favorably less than 0.5% from 0 to approximately 55 degrees angle of incidence. As mentioned previously, this coating can be applied to the optical surfaces for lenses and prisms used in projection and illumination components of a lithography system.

In order to obtain high adhesion between a low packing density wet process coating and a high packing density coating, one can locate the layer of high packing density oxide coatings (which can be fabricated by either a dry or wet process) under the low packing density SiO$_2$ layer. Chemical bonding is believed to occur between the low packing density SiO$_2$ layer and the high packing density oxide layer. All four of the above discussed examples use this configuration. However, the present invention is in no way limited to such a configuration.

This disclosure is illustrative and not limiting; further modifications will be apparent to one skilled in the art in light of this disclosure and are intended to fall within the scope of the appended claims.

What is claimed is:

1. A method for forming an optical anti-reflection coating onto a substrate, comprising the acts of:

forming an anti-reflection layer of a first material over the substrate using a dry process; and forming a second anti-reflection layer of a second material overlying the first layer using a wet process.

2. The method of claim 1, wherein the first and second materials are the same.

3. The method of claim 1, wherein the first and second materials differ.

4. The method of claim 1, further comprising the act of forming an additional anti-reflection layer, under the first layer, by a dry process.

5. The method of claim 1, further comprising the act of forming a plurality of additional anti-reflection layers, under the first layer, each additional layer being formed by a dry process.

6. The method of claim 1, wherein the dry process is one of a group consisting of vacuum evaporation, sputtering, and chemical vapor deposition.

7. The method of claim 1, wherein the wet process includes a sol-gel process.

8. The method of claim 7, wherein the sol-gel process includes hydrolysis and polymerization of a metal alkoxide solution.

9. The method of claim 1, wherein the second layer has a different refractive index than does the first layer.

10. The method of claim 1, wherein the second layer has a lower packing density than does the first layer.

11. The method of claim 1, wherein the first and second layers are each an oxide material, thereby to obtain high adhesion between the first and second layers.

12. The method of claim 1, wherein the second layer is formed at less than 150 degrees C.

13. A structure comprising:

a substrate having thereon an optical anti-reflection coating comprising:

a first anti-reflection layer of a first material over the substrate and having a first refractive index wherein the first laver is formed by a dry process; and a second anti-reflection layer over the first layer, of a second material and having a different second refractive index, wherein the second layer is formed by a wet process.

14. The structure of claim 13, wherein the first and second materials are the same.

15. The structure of claim 13, wherein the first and second materials differ.

16. The structure of claim 13, wherein the wet process is a sol-gel process and includes hydrolysis and polymerization of a metal alkoxide solution.

17. An optical component having the structure of claim 16.

18. The structure of claim 13, further comprising an additional anti-reflection layer, under the first layer, formed by a dry process.

19. An optical component the structure of claim 17.

20. An optical component having the structure of claim 13.

21. An optical system having the optical component of claim 20.

22. A structure comprising:
   a substrate having thereon an optical anti-reflection coating for ultraviolet light, the coating comprising:
      a first anti-reflection layer of a first material over the substrate and having a first refractive index, wherein the first layer is formed by one of a wet or dry process; and
      and a second anti-reflection layer over the first layer, of a second material and having a different second refractive index, wherein the second layer is formed by a wet process and has a lower packing density than that formed by a dry process.

23. The structure of claim 22, further comprising an additional a plurality of anti-reflection layers, under the first layer, formed by either a dry or wet process.

24. A method for forming an optical anti-reflection coating for ultraviolet light onto a substrate, comprising the acts of:
   forming an anti-reflection layer of a first material over the substrate using one or a wet or dry process; and
   forming a second anti-reflection layer of a second material overlying the first layer using a wet process, wherein the second layer is adapted to have a lower packing density than that formed by a dry process.

25. The method of claim 24, for further comprising the acts of:
   forming an additional a plurality of anti-reflection layers, under the first layer using either a dry or wet process, including:
      forming an additional anti-reflection layer of a first material over the substrate using one of a wet or dry process; and
   forming a second additional anti-reflection layer of a second material overlying the first layer using a wet process, wherein the second layer is adapted to have a lower packing density than that formed by a dry process.

* * * * *